No. 888,993. PATENTED MAY 26, 1908.
F. M. GASS.
TROLLEY WHEEL.
APPLICATION FILED JAN. 27, 1906.
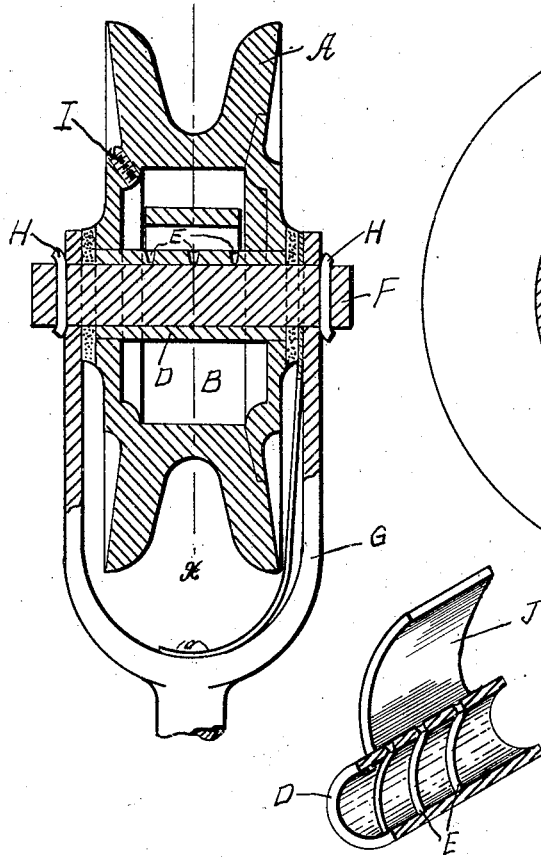
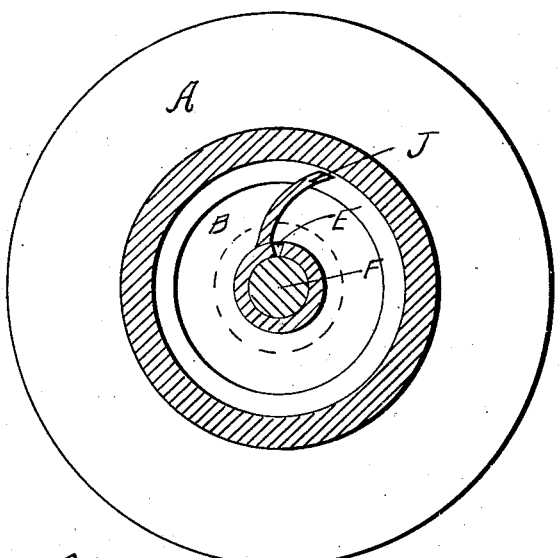
WITNESSES
INVENTOR
Frank M. Gass
BY
ATTORNEY

UNITED STATES PATENT OFFICE.

FRANK M. GASS, OF PHILADELPHIA, PENNSYLVANIA.

TROLLEY-WHEEL.

No. 888,993.   Specification of Letters Patent.   Patented May 26, 1908.

Application filed January 27, 1906. Serial No. 298,101.

*To all whom it may concern:*

Be it known that I, FRANK M. GASS, a citizen of the United States, residing at Philadelphia, county of Philadelphia, and State of Pennsylvania, have invented a certain new and useful Improvement in Trolley-Wheels, of which the following is a specification.

My invention relates to a new and useful improvement in trolley wheels, and has for its object to so construct a wheel of this description as to provide for the positive lubricating of the same, thus overcoming the many disadvantages heretofore experienced in the use of such wheels by reason of the uncertainty of the bearings being at all times properly lubricated.

With these ends in view, this invention consists in the details of construction and combination of elements hereinafter set forth and then specificially designated by the claims.

In order that those skilled in the art to which this invention appertains may understand how to make and use the same, I will describe its construction in detail, referring to the accompanying drawing forming a part of this specification, in which—

Figure 1 is a central section of a wheel and bearing made in accordance with my improvement, showing the same journaled in the harp. Fig. 2, a section at the line x—x of Fig. 1. Fig. 3 is a sectional perspective of the bushing and deflector.

Referring to the drawings A represents the wheel which is made of a single casting having the usual peripherical groove for following the wire and the central portion of this wheel is cast hollow so as to produce the recess or chamber B.

D represents a bushing which is fitted tightly within the hubs of the wheel so as to revolve therewith and is preferably of steel, and has formed therein the holes E in order that the oil contained in the recess B may be fed through the bushing to the axle pin F which passes through the bushing and is secured in the harp G by suitable cotter pins H.

A hole of sufficient size to permit filling the chamber B with oil is formed in one side of the wheel and is closed by a screw I, and when it is necessary to fill the chamber the screw is removed for that purpose.

From the above description it will be seen that when the chamber B is filled with oil the same will constantly be fed through the holes E to the axle pin and thus keep the bearing properly lubricated, the heat generated by the rotation of the wheel causing the oil to readily flow into the bearing.

To feed the oil to the bearing throughout the time the car is running as may be the case in high speed long distance service, a deflector J is provided within the chamber as shown in Fig. 3 so that the centrifugal force imparted to the oil by the rapid rotation of the wheel after throwing said oil against the outer walls of the chamber will cause it to flow inward down the deflector to the bushing and through the holes E and thus to the bearing, and it will be obvious the greater the speed of the trolley the greater will be the force with which the oil is driven to the bearing. As depicted in Fig. 3, I employ but a single deflector which is of plate-form cast integral with bushing D, and which is of equal thickness throughout. This deflector is arcuate in form and extends to a point closely adjacent the inner face of chamber B.

Having thus fully described my invention, what I claim as new and useful, is—

In a trolley wheel, a wheel casting constructed with an interior oil chamber, a bushing extending through said oil chamber and formed with a longitudinal row of apertures and a single plate like deflector carried by said bushing and extending angularly and curvingly therefrom, said deflector having its free edge slightly spaced from the wall of said chamber and being of a width equal to the distance between the apertures at the ends of the said row, said apertures being formed adjacent to the concave face of said deflector.

In testimony whereof, I have hereunto affixed my signature in the presence of two subscribing witnesses.

FRANK M. GASS.

Witnesses:
JOSEPH J. GEGGIS,
S. M. GALLAGHER.